United States Patent
Parimi et al.

(10) Patent No.: US 11,632,373 B2
(45) Date of Patent: Apr. 18, 2023

(54) ACTIVITY BASED AUTHORIZATION FOR ACCESSING AND OPERATING ENTERPRISE INFRASTRUCTURE

(71) Applicant: CloudKnox Security Inc., Sunnyvale, CA (US)

(72) Inventors: Balaji Parimi, Sunnyvale, CA (US); Venkata Adusumilli, Cupertino, CA (US); Maya Neelakandhan, Sunnyvale, CA (US); Naga Venkata Naveen Teja Jangalapalli, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/904,484

(22) Filed: Jun. 17, 2020

(65) Prior Publication Data
US 2020/0403996 A1    Dec. 24, 2020

Related U.S. Application Data

(60) Provisional application No. 62/863,185, filed on Jun. 18, 2019.

(51) Int. Cl.
*H04L 29/06* (2006.01)
*H04L 9/40* (2022.01)

(52) U.S. Cl.
CPC .................. *H04L 63/10* (2013.01)

(58) Field of Classification Search
CPC .............. H04L 63/10; H04L 63/102
USPC ......................................................... 726/4
See application file for complete search history.

(56) References Cited

U.S. PATENT DOCUMENTS

| | | | |
|---|---|---|---|
| 7,774,827 B2 | 8/2010 | Kinser et al. | |
| 10,148,629 B1* | 12/2018 | Roth | H04L 63/0838 |
| 2007/0143851 A1* | 6/2007 | Nicodemus | G06F 21/577 |
| | | | 726/25 |
| 2011/0296490 A1 | 12/2011 | Faitelson et al. | |
| 2017/0078322 A1 | 3/2017 | Seiver et al. | |

(Continued)

FOREIGN PATENT DOCUMENTS

| | | | | |
|---|---|---|---|---|
| CN | 109792439 A * | 5/2019 | | F16K 31/05 |
| EP | 3617917 A1 * | 3/2020 | | G06F 21/10 |

OTHER PUBLICATIONS

CN-109792439-A English Translation (Year: 2019).*
PCT International Search Report and Written Opinion, PCT Application No. PCT/US20/38506, dated Sep. 9, 2020, 13 pages.

*Primary Examiner* — Tu T Nguyen
(74) *Attorney, Agent, or Firm* — Weaver IP L.L.C.

(57) ABSTRACT

A security server provides dynamic permissions for an enterprise data source. The security server establishes permissions rules for a data source of the enterprise. For example, the permissions rules describe permissions policies applicable to users of the enterprise in given contexts. The security server evaluates the permissions rules in view of a context to produce a dynamic permissions policy for the data source. The context describes the environment of the data source at a point in time (e.g., a current time). The dynamic permissions policy describes permissions of users of the enterprise with respect to the data source and the context. The security server transmits the dynamic permissions policy to the enterprise such that the enterprise is able to implement the dynamic permissions policy at the data source.

20 Claims, 7 Drawing Sheets

(56) References Cited

U.S. PATENT DOCUMENTS

2020/0076835 A1* 3/2020 Ladnai ................ H04L 63/1433
2020/0106780 A1* 4/2020 Malliah ................ H04L 63/102

* cited by examiner

ACTIVITY BASED AUTHORIZATION FOR ACCESSING AND OPERATING ENTERPRISE INFRASTRUCTURE

CROSS REFERENCE TO RELATED APPLICATIONS

This application claims the benefit of U.S. Provisional Application No. 62/863,185, filed Jun. 18, 2019, which is incorporated by reference in its entirety.

BACKGROUND

This disclosure relates generally to computer security, and more particularly to controlling permissions granting access to enterprise infrastructures.

Enterprise infrastructures are collections that may include hardware, software, networks, data centers, facilities, and relate equipment used to develop, test, operate, monitor, manage, and/or support information technology services. Accordingly, enterprise infrastructures store large amounts of data that may relate to internal operations, customers, third parties, and the like. Oftentimes, the data is sensitive and valuable such that enterprises will be harmed if the data is exposed. Enterprises therefore take care to protect the data from unauthorized release.

Enterprises may implement a number of security measures to protect data stored in enterprise infrastructures. For example, enterprises implement one or more layers of security (e.g., physical security of data centers, security of hardware and software underlying enterprise infrastructures, and processes to provision or deprovision the virtual infrastructure). Data may be stored by an enterprise using one or more enterprise infrastructures and using a variety of different techniques. For example, some data may be stored internally using infrastructures dedicated to the enterprise. Other data may be stored remotely using infrastructures provided by service providers. The data is typically protected by security infrastructures of the data stores that restrict access to only those entities that have appropriate permissions.

When workloads can be deleted with a keystroke, understanding and managing privileges for all users across all systems for an enterprise is critical. A problem arises when users of an enterprise are granted permissions to the infrastructures that are not aligned with their needs. It is difficult for administrators of enterprises to match the users' permissions to the users' needs. This problem is particularly acute in enterprises that have many users, many data stores, and/or many available actions for automating tasks. Oftentimes, users are granted permissions in excess of their actual requirements. For example, a user may have been assigned to a system administrator role, such that the user has permission to perform high-risk actions that are not relevant to day-to-day performance, permission to view data that the user has no need to see, or permission to edit data that the user has no need to change.

This misalignment of permissions presents security risks to the enterprises. A malicious identity might obtain unauthorized access to a user's account at an enterprise and then use this access to obtain the enterprise's virtual infrastructure. If the user has broad data access permissions, then the malicious actor can potentially perform a wide variety of malicious actions, from data misuse to completely disrupting the enterprise's systems. In today's dynamic environment, this malicious identity can take down a data center in seconds with a single keystroke.

SUMMARY

The above and other issues are addressed by a security platform that provides activity-based permissions policies to be enforced on the infrastructure associated with an enterprise. An enterprise system collects permissions data describing use of permissions by users of the enterprise on one or more infrastructure components associated with the system. The enterprise system suggests an activity-based permissions policy to be enforced on the data sources, the request including permissions data.

The security server implements non-intrusive activity-based authorization across any private or public infrastructure of an enterprise by establishing permissions rules for users of the infrastructures. The permissions rules describe permissions policies applicable to users of the enterprise in given contexts and enables management of identity privileges based on actual activity of users of the infrastructures without negatively impacting productivity or trust.

Further, the security system allows for activity monitoring of users of the infrastructure. Activity monitoring and accounting for actions executed by users of the infrastructures enables the security system to generate granular insights into privileges and activities used (or not used) by each identity. The granular insights may be valuable to administrators of enterprises in manually revoking or granting privileges for individual identities with access to infrastructures.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
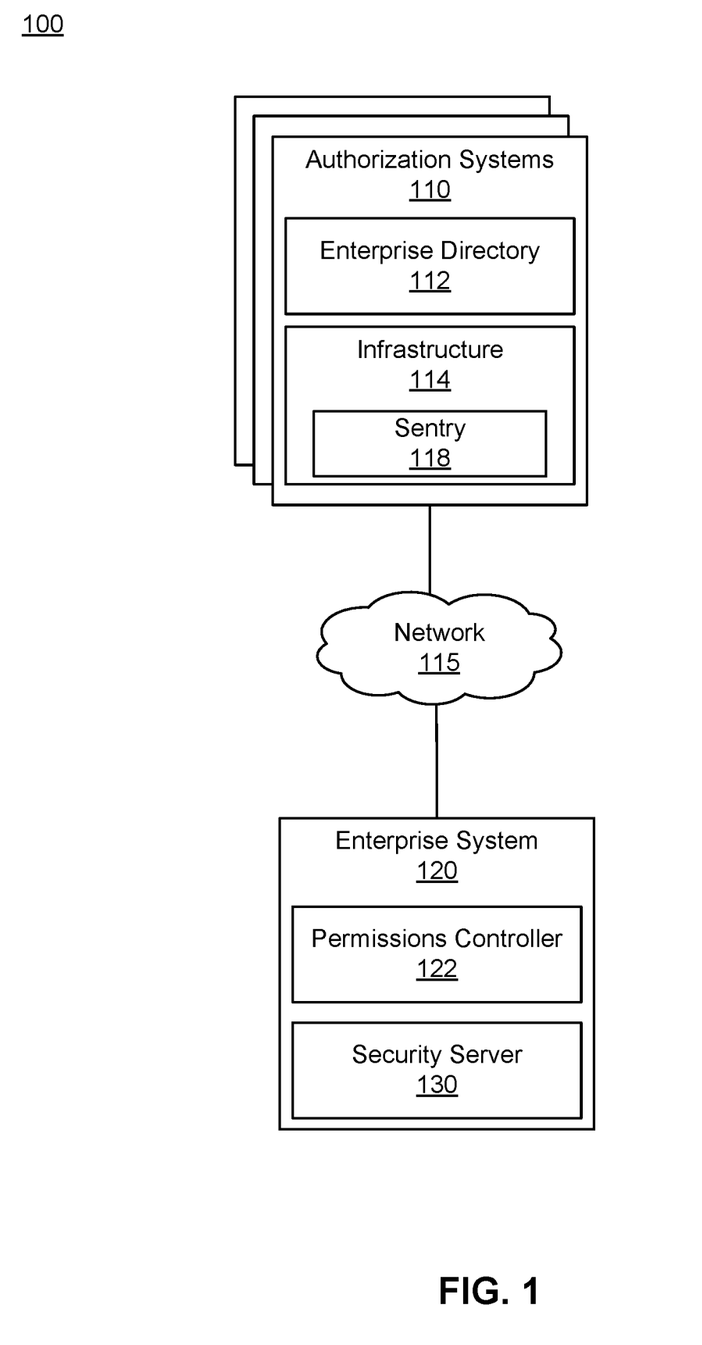
FIG. 1 is a block diagram of an environment including a security server providing activity-based permissions for enterprise infrastructures, according to one embodiment.

FIG. 1 is a block diagram of an environment 100 including a security server 130 providing dynamic permissions for enterprise authorization systems 110, according to one embodiment. The system environment 100 shown by FIG. 1 comprises one or more authorization systems 110 connected to an enterprise system 120 via a network 115. While only a few authorization systems 110 are shown in FIG. 1, embodiments of the environment 100 can have many such entities connected to the network 115. Likewise, embodiments can have multiple enterprise systems 120 and/or security servers. Different and/or additional entities may also be connected to the network 115.

The authorization systems 110 store data on behalf of enterprises. In one embodiment, the authorization systems 110 remotely host infrastructures. For example, an authorization system can be a service provider such as AMAZON WEB SERVICES, MICROSOFT AZURE, or GOOGLE CLOUD PLATFORM. In another embodiment, at least some of the authorization systems 110 are implemented locally at an enterprise. The authorization systems 110 may also be implemented using other techniques.

An authorization system 110 contains an enterprise directory 112 and an infrastructure 114. The enterprise directory 112 stores data describing identities (users, resources, etc.) of an enterprise with access to the infrastructure 114. In one embodiment, the enterprise directory 112 stores data for each user of the enterprise including one or more user identities, one or more user roles, a name of the user, and other data identifying the user of the enterprise. In an embodiment, the enterprise directory 112 is external to the authorization system 110.

The infrastructure 114 controls access to the data stored by the authorization system 110. An infrastructure may include resources, data sources, and the like. The infrastructure 114 stores and applies one or more permissions policies to the users described by the enterprise directory 112. The permissions policies specify the extent to which the users can access the data stored by the authorization system 110. In one embodiment, the infrastructure 114 stores permissions based on user identity, action, and resource of the authorization system 110. For example, the infrastructure 114 identifies whether a given user is authorized to perform a requested action on a specified resource of the authorization system 110.

The infrastructure 114 further includes a sentry 118 that receives and executes updates to the infrastructure or to the authorization system 110. The sentry 118 retrieves software updates and/or permissions updates from the enterprise system 120. In some embodiments, software updates may be updates made to the infrastructure 114, including updates to permissions implemented by the infrastructure. For example, the sentry 118 receives updated permissions from the enterprise system 120 and stores the updated permissions for use by the infrastructure 114. In other embodiments, software updates may be updates made to the data of the authorization system 110 or to the enterprise directory 112.

Further, the sentry 118 collects data describing actions performed by identities of the authorization system 110 on the infrastructure 114 and uploads the collected data to the enterprise system 120 for use by a security server 130 in determining activity-based permissions for the authorization system. The sentry 118 collects information describing the actions performed on the infrastructure 114 and the authorization system 110. The collected data has records of requests to perform actions, the identity of the user that made the request, the resource (e.g., data) subject to the request, and the outcome of the request. The outcome indicates whether the request was granted (and the action performed) or denied (and the action was blocked). The log also records other metadata about requests and the authorization system 110, such as timestamps associated with requests and actions.

In an embodiment, the authorization system 110 provides one or more APIs (application programming interfaces) that allows outside entities, such as the enterprise system 120, to interact with the authorization system 110. Through the APIs, identities (including services) with appropriate permissions can view and modify information in the enterprise directory 112. Users can also use the APIs to request and perform actions on the data in the infrastructure 114, and to view and modify the permissions policies maintained by the infrastructure 114.

The enterprise system 120 is a computer system associated with an enterprise. An enterprise, in turn, is a business, educational institution, and/or other form of organization. The enterprise has a set of users, such as employees, that access the data in the authorization systems 110 as they fulfill their roles on behalf of the enterprise. One or more of the users may be administrators that set policies for the enterprise, such as permissions policies for enterprise authorization systems 110.

The enterprise system 120 communicates with the authorization systems 110 via the network 115. In one embodiment, the enterprise system 120 is a real or virtual computer system that resides on the physical premises of the enterprise or is otherwise under exclusive control of the enterprise. The enterprise system 120 serves as an exclusive conduit between the authorization systems 110 (or at least an authorization system) and the enterprise. Users of the enterprise access the APIs of the authorization systems 110 through the enterprise system to perform tasks including accessing stored data, setting permissions policies, and obtaining log data. Having the enterprise system 120 serve as an exclusive conduit to the authorization systems 110 provides enhanced security because it restricts access to the authorization systems 110 to only users that have access to the enterprise system 120. Malicious entities cannot access the enterprise's data on the authorization system 110 through alternative pathways.

The enterprise system 120 contains a permissions controller 122. The permissions controller 122 is a software or hardware module that implements permissions policies on authorization systems 110 on behalf of the enterprise. In one embodiment, the permissions controller 122 receives permissions data from the authorization systems 110. This data includes information about users from the enterprise directory 112 and logs and permissions policies from the sentry 118. The permissions controller 122 provides the permissions data to the security server 130.

In addition, the permissions controller 122 receives dynamic permissions policies for the authorization systems 110 from the security server 130. The permissions controller 122 is configured such that a sentry 118 of an authorization system 110 may access dynamic permissions policies for implementation and enforcement on the authorization system.

The enterprise system 120 additionally contains a security server 130. The security server 130 receives permissions data from the permissions controller 122 describing permissions implemented on the authorization systems 110 for the enterprise. The security server 130 analyzes the permissions data and provides an interface with which an administrator of the enterprise can view and change the permissions. For example, the security server 130 may provide a cloud-based service including a secure portal accessible to the administrator.

In one embodiment, the security server 130 interacts with the administrator to establish permissions rules for the enterprise. The permissions rules describe permissions policies applicable in given contexts. A context includes state information describing the environment involving the enterprise and/or one or more authorization systems 110 at a given point as time, where the environment is described in part by the permissions data. The permissions policies applicable in given contexts may indicate, for example, permissions rules applicable within specific time windows and/or in response to certain sequences of events. The security server 130 evaluates the permissions rules in view of the permissions data and current context to determine activity-based permission policies applicable at given points in time, such as the current time. The security server 130 transmits the activity-based permissions policies to the permissions controller 122, such the sentry 118 may access and implement the activity-based permissions policies on the authorization systems 110.

The security server 130 thus provides a centralized service that can be used by administrators of enterprises to control user permissions with respect to authorization systems 110 used by the enterprises. An enterprise administrator can view the current permissions policies for multiple authorization systems 110, and can specify permissions rules that change depending upon the current context. The security server 130, in turn, interacts with the permissions controller 122 in the enterprise to dynamically update the permissions policies of the authorization systems 110. The security server 130 allows the administrator to fine tune the enterprise permissions policies to precisely match the needs of the enterprise users for a current context, ensuring that each user currently has permissions commensurate with that user's needs within the enterprise. Overall computer and data security of the enterprise is thereby improved because a malicious actor cannot exploit a user's excess permissions to harm the enterprise.

The network 115 comprises any combination of local area and/or wide area networks, using both wired and/or wireless communication systems. In one embodiment, the network 115 uses standard communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

Figure 2:
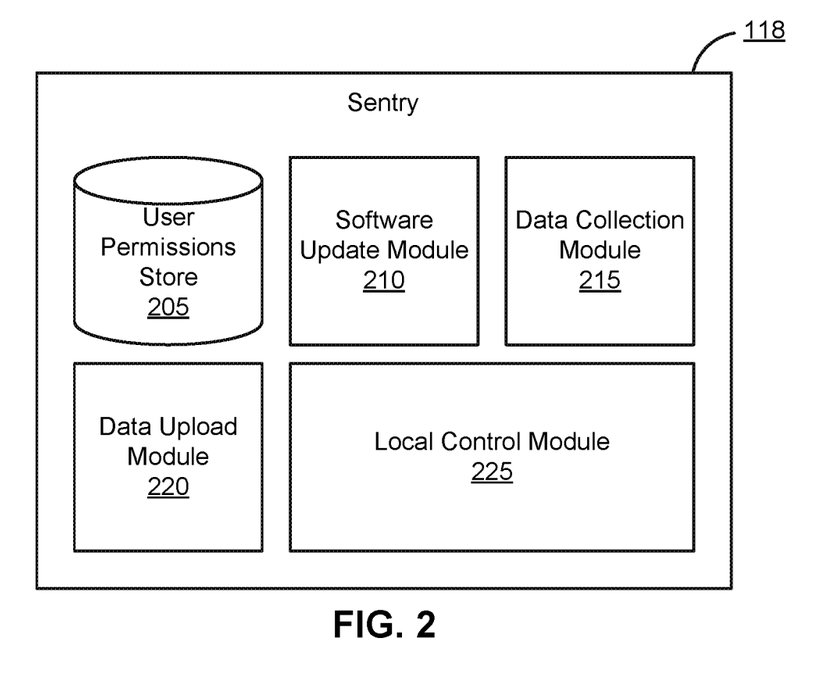
FIG. 2 is a block diagram of an architecture of a sentry, in accordance with an embodiment.

FIG. 2 is a block diagram of an architecture of the sentry 118 according to one embodiment. The sentry shown in FIG. 2 includes a user permissions store 205, a software update module 210, a data collection module 215, a data upload module 220, and a local control module 225. In other embodiments, the sentry 118 may include additional, fewer, or different modules. In addition, the functionality attributed to specific modules herein may be performed by other modules in other embodiments.

The user permissions store 205 stores and maintains data describing permissions in association with identities of the authorization system 110. For example, for each user identified by the enterprise directory 114, the user permissions store 205 identifies permissions associated with the user on the authorization system 110. In particular, the user permissions store specifies the actions each user is authorized to perform on each resource provided by the authorization system 110. The user permissions stores 205 of different authorization systems 110 may represent the data within the user permissions stores in different manners.

The software update module 210 receives and implements updates to the sentry 118. The software update module 210 provides an API that can receive software from outside systems, such as the permissions controller 122. Upon receiving an update, the software update module 210 updates the software in the sentry 118 based on the update.

The data collection module 215 collects information describing the actions performed by users on data of the authorization systems 110 and collects data describing the actions and associated permissions. Each action performed on data of the authorization systems 110, such as modifying, adding, deleting, storing, downloading, etc. data, is associated with a user identity performing the action and a permission used to perform the action. For example, an administrator of an authorization system 110 performs a delete action on one or more data files stored by the infrastructure 114 using permissions associated with an administrator role on the authorization system. The data collection module 215 identifies a user identity associated with the administrator, the performed delete action and the associated data files, and the administrator permissions used to execute the performed delete action. In some embodiments, the data collection module 215 transmits data in real-time or near real-time to the data upload module 220. In other embodiments, the data collection module 215 stores data in a data store within the sentry 118 until the data is transmitted.

The data upload module 220 uploads data describing actions performed by identities and associated permissions to a permissions controller 122 of an enterprise system 120 via the network 115. The data upload module 220 accesses data collected by the data collection module 215 for a previous period of time (e.g., a period of time since a last data upload). The data describes actions performed on the authorization systems 110 during the previous period of time, identities associated with the performed actions, and permissions used to perform the actions. In some embodiments, the data upload module 220 automatically uploads data to a permissions controller 122 or other entity in real-time or near real-time (e.g., as data is received from the data collection module). In other embodiments, the data upload module 220 automatically uploads data to a permissions controller 122 or other entity at regular intervals based on an amount of data (e.g., when a specified number of actions is received by the data upload module 220), a period of time (e.g., every hour, every day, every week), or a current time (e.g., at 5 PM each day, at 5 PM each Monday).

The local control module 225 accesses the user permissions store 205 and implements an activity-based permissions policy for users of the authorization system 110 as suggested by the permissions controller 122.

Figure 3:
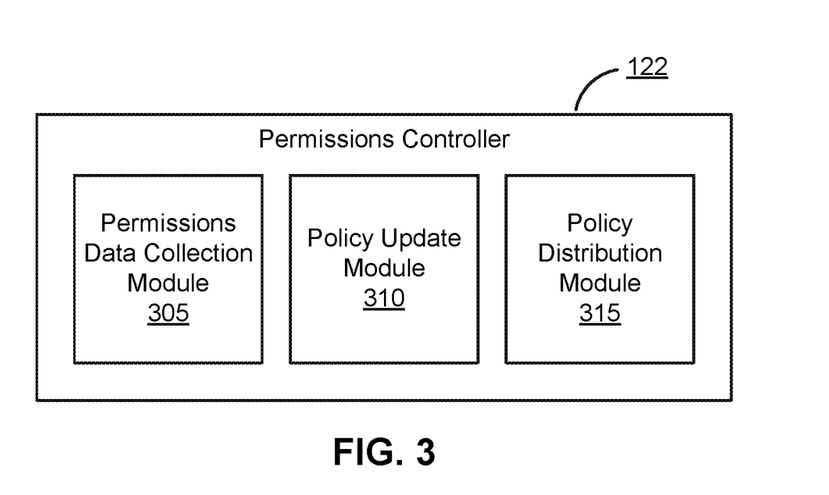
FIG. 3 is a block diagram of an architecture of a permissions controller, in accordance with an embodiment.

FIG. 3 is a block diagram of an architecture of the permissions controller 122 according to one embodiment. The permissions controller shown in FIG. 3 includes a permissions data collection module 305, a policy update module 310, and a policy distribution module 315. In other embodiments, the permissions controller 122 may include additional, fewer, or different modules. In addition, the functionality attributed to specific modules herein may be performed by other modules in other embodiments.

The permissions data collection module 305 receives and stores permissions data describing the permissions policies and actions performed by users of the enterprise on the enterprise's authorization systems 110. The polices describe the permissions of the identities with respect to actions on resources provided by the authorization system 110. The available actions may be explicitly described by the permissions policy and/or may be implicitly determined by the permissions data collection module 305 based on the type of infrastructure. The permissions data collection module 305 also interacts with the authorization system 110 to obtain enterprise directory 112 information describing the users referenced by the permissions policies, which may be a subset of the users identified in the directory. Further, the permission data collection module 305 obtains log data describing actions performed on the authorization system 110 and associated metadata.

The permissions data collection module 305 may collect the permissions data in real-time or on a set schedule (e.g., every N minutes or hourly). The permissions data collection module 305 stores the information at least temporarily, and forward the collected permissions data to the security server 130. As with collecting the information, the permissions data collection module 305 may forward the permissions data in real time or on a set schedule. In addition, the permissions data collection module 305 may forward the permissions data responsive to a threshold amount of data being collected, upon request of an administrator of the enterprise, and/or upon request from the security server 130.

The policy update module 310 additionally receives permissions policies from the security server 130 and transmits the received permissions policy to the policy distribution module 315 to be enforced. In an embodiment, the policy update module 310 receives permissions policies responsive to a request for an update. The policy update module 310 receives permissions policy updates from the security server 130 in response to the requests. Since the updates are received frequently, the updated permissions policies are considered dynamic.

The policy distribution module 315 transmits the permissions policies to the appropriate authorization systems 110 using a pull mechanism of the sentry 118. The policy distribution module 315 receives the permissions policy updates from the policy update module 310. The policy distribution module 315 analyzes the permissions policy updates to determine the authorization systems 110 affected by the updated policies. The permissions policy updates may explicitly identify one or more authorization systems 110 associated with the respective updates. In this case, the policy distribution module 315 transmits the updated policies to the identified authorization systems 110 using the pull mechanism of the sentry 118. The permissions policy updates may also implicitly identify the associated authorization systems 110 based on data within the policies, such as based on the users or action. For example, if a policy update specifies permissions for a particular user who has permission with only a subset of the authorization systems 110, then the policy update implicitly identifies only the data sources in the subset.

The policy distribution module 315 transmits the permissions policies to the respective associated authorization systems 110 using the pull mechanism of the sentry 118. The local control module 225 updates the permission policies of the authorization systems 110 to match the permissions specified by the permission policy updates. In one embodiment, a permission policy indicates explicit API instructions for updating the permission policy of an authorization system 110. In this case, the local control module 225 accesses the API to rely the indicated instructions. In another embodiment, a permission policy indicates the updated permission policy in different terms, in which case the local control module 225 maps the updated permission policy to the equivalent API instructions for the authorization system 110.

Figure 4:
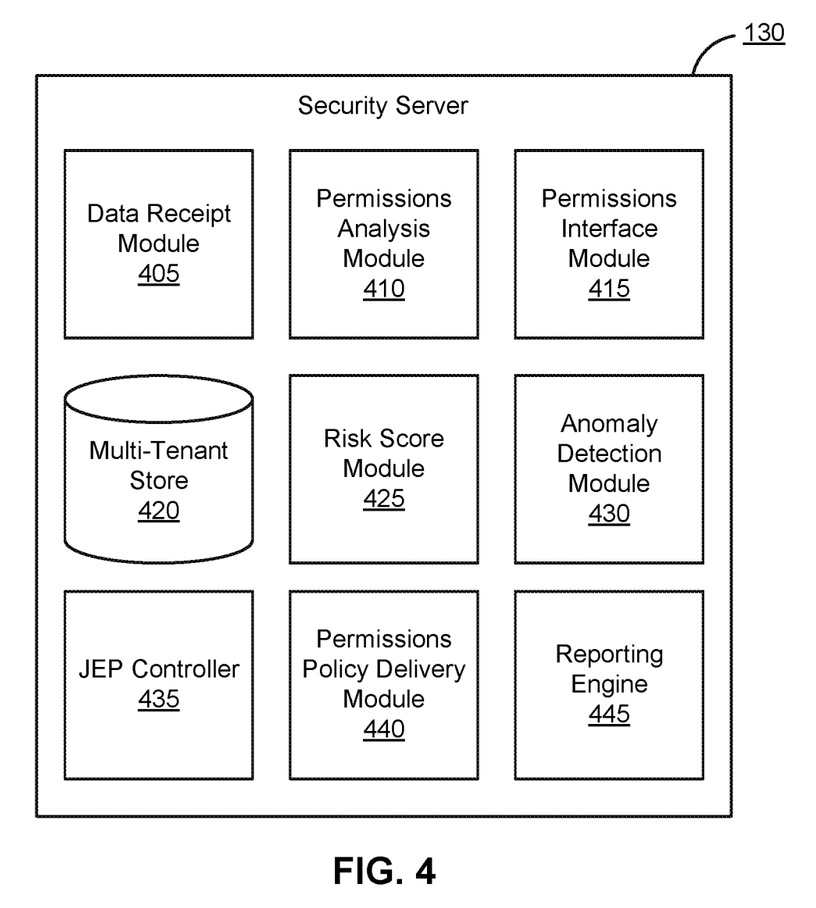
FIG. 4 is a block diagram of an architecture of a security server, in accordance with an embodiment.

FIG. 4 is a block diagram of an architecture of the security server 130 according to one embodiment. The security server shown in FIG. 4 includes a permissions data receipt module 405, a permissions analysis module 410, a permissions interface module 415, a multi-tenant store 420, a risk score module 425, an anomaly detection module 430 a JEP controller 435, a permissions policy delivery module 440, and a reporting engine 445. In other embodiments, the security server 130 may include additional, fewer, or different modules. In addition, the functionality attributed to specific modules herein may be performed by other modules in other embodiments.

The permissions data receipt module 405 receives permissions data from the permissions controller 122. The permissions data receipt module 405 transmits the received permissions data to the permissions analysis module 410. The permissions data receipt module 405 may also transmit the permissions data to other modules within the security server 130.

The permissions analysis module 410 analyzes the permissions data to determine the current permissions in place at the enterprise authorization systems 110. In one embodiment, the permissions analysis module 410 represents a permissions as:

permission=action+identity+resource.

Here, the identity refers to the user or user role or service account or app or group or resource having the permission. The action identifies an action the identified identity can perform on the authorization system 110. The resource, in turn, refers to the data or other resource on the authorization system 110 upon which the identified identity can perform the identified action. In this formulation, each authorization system 110 has its own set of permission. There may be relationships among the permissions of various authorization systems 110. For example, an identity may have permissions on different resources of different authorization systems 110.

The permissions analysis module 410 represents the current permissions using a graph-based data structure called a "permissions graph." The permissions graph includes nodes representing identities, actions, and resources and edges representing relationships among these entities. In some embodiments, a permissions graph is a singular representation of permissions across all authorization systems 110 associated with an enterprise. In other embodiments, a permissions graph is a representation of permissions for a singular authorization system 110 associated with an enterprise. The permissions graph may also be supplemented using information from the enterprise directories 112 of the authorization system 110. For example, the nodes representing the identities can also include or reference information about the associated users' roles.

The permissions analysis 410 uses the permissions graph to perform one or more analyses of the permissions data. These analyses may include: identifying default permissions enforced on the authorization systems 110; identifying resources and actions available for permissions; identifying frequency of usage of permissions by individual users, user groups by role, or other subsets of users; and identifying frequencies at which various types of permissions are used.

In one embodiment, the permissions analysis module 410 analyzes the permissions graph to identify permissions granted to particular users that are never or rarely used by the users. For this analysis, the permissions analysis module 410 identifies the nodes associated with a particular user and traverse the graph to determine the set of permissions available to the user. The permissions analysis module 410 also accesses permissions data associated with the identity to determine which actions the identity performed on which resources. The permissions analysis module 410 compares the user permissions with the activities performed by the user to identify permissions that the user never or rarely used, where "rarely" means used less than a threshold number of times within a time period.

Additionally, an embodiment of the permissions analysis module 410 analyzes the permission graph and permissions data to determine when (i.e., at what times) users are performing actions on resources. This analysis identifies patterns related to when actions are performed. The patterns may indicate that a certain user tends to perform certain actions within a certain time interval. The permissions analysis module 410 may perform this analysis by grouping a user's actions by type, and then binning repeated action of a same type in a histogram based on the time intervals to determine in which time intervals the user tends to perform the action. For example, the permissions analysis module 410 may determine that a user corresponding to a backup job typically reads a certain set of files within a certain time period every night (e.g., 12-1 AM).

The permissions interface module 415 generates user interfaces allowing administrators of enterprise systems 120 to view, organize, and change data describing permissions enforced on one or more authorization systems 110. For example, the permissions interface module 415 displays data generated by the permissions analysis module 410 in conjunction with the permissions data received by the permissions data receipt module 405. An administrator of an enterprise can view the user interfaces by accessing the portal provided by security server 130 using the enterprise system 120 or another device, such as a client computer system.

In one embodiment, the generated interface allows an administrator to navigate, organize, and edit permissions data. For example, the permissions interface module 415 generates an interface that allows the administrator of the enterprise system 120 to view and manipulate the permissions graph. Through these views, the administrator can view all user identifiers associated with a given permission, all permissions associated with a user identifier, permissions used in a specified time period (e.g., all permissions used in the last day, all permissions used in the last week). In another example, the permissions interface module 415 generates an interface that allows the administrator of the enterprise system 120 to view all actions of a certain type (e.g., all deletions performed). The administrator can use the views provided by the permissions interface module 415 to edit permissions policies and thereby grant and revoke permissions for users.

The multi-tenant store 420 receives and stores data describing the identities, actions, resources, permissions, and activities. As mentioned above, permissions describe policies applicable in given contexts, such as permissions applicable within specific time windows and/or in response to certain sequences of events.

In an embodiment, the permissions rules are specified for each authorization system 110. The permissions rules may specify conditional permissions which are granted only if specified conditions are satisfied. For example, conditional permissions may include time-based or IP address/location-based permissions, such that a permission is available to a user for a specified time limit, during a scheduled period of time (e.g., during business hours), based on an IP address of access, based on a system environment, based on a country of access, based on a geolocation, and the like. In another example, conditional permissions may be identification-based, such that a permission is available responsive to multifactor authorization, a particular user role, or a particular user identifier.

In one embodiment, conditional permissions may be demand-based, such that a permission is available on demand, recurring on demand, or on failure. Permissions available on demand are granted when requested and subsequently revoked. For example, an on demand permission may be granted in response to a user requesting to perform an action for which the user currently lacks permission, and then revoked after a specified time interval. Permissions available recurring on demand are granted on a recurring schedule (e.g., granted on demand within a specified recurring time window). Permissions available on failure are not initially granted, but are granted responsive to a user attempting and failing to perform an action and a condition being met.

The risk score module 425 calculates risk scores for an enterprise based on permissions policies for the enterprise authorization systems 110. A risk score represents a likelihood that data stored on the one or more authorization systems 110 may be compromised or exploited due to permissions associated with identities of the enterprise. The risk score module 425 determines a set of permissions applicable in a given context, such as the set of granted permissions in permissions policies for a current or hypothetical context, and quantifies the risk associated with that permission set. For each permission in the set, the risk score module 425 assigns a risk weight to the associated identity, action, and resource. The weights may be integer values, where a low value indicates relatively low risk and a high value indicates relatively high risk.

The risk score module 425 uses this framework to calculate risk scores for the enterprise from a variety of perspectives. A risk score for an action may be based on a number of users capable of performing a particular action. Likewise, a risk score for a user may be based on the risks associated with the actions that the user has permission to perform and/or the resources to which the user has access. In one embodiment, the risk score module 425 calculates a risk score in view of the permissions data describing actual usage of the permissions at the enterprise. For example, the risk score module 425 may calculate a risk score based on the number of times an action was performed by one or more users within a time period. The risk score module 425 may also calculate a risk score based on the unused permissions for a user or resource. For example, a user having a large number of permissions that the user never uses may be assigned a risk score indicating a relatively high risk. In one embodiment, the risk score module 425 recalculates a risk score at periodic time intervals.

The anomaly detection module 430 monitors data describing activity on the authorization systems 110 to identify anomalies in activity. Anomalous activity is determined in the current context of the enterprise. For example, anomalous activity includes a user requesting access to a permission that the user has never previously used, or a delete action or another modification being requested on data flagged as secure or locked. Responsive to detection of an anomalous activity, the anomaly detection module 430 flags the activity or the requested permission and generates an alert. The generated alert is transmitted to the reporting engine 445 for display to an administrator of the authorization system 110. In some embodiments, the request associated with the anomalous activity is not executed on the authorization system 110 until an administrator has reviewed or approved the generated alert.

The JEP controller 435 receives permissions data from the permissions analysis module 410, the data describing permissions rules from the rules store 420, and risk scores from the risk score module 425. The JEP controller 435 uses this information to generate dynamic permissions policies based on the current context of the enterprise. Based on the permissions data, results of analyses performed on the permissions analysis module 410 and the rules, the JEP controller 435 identifies a permissions context describing the context for the dynamic permissions policy at a point in time, such as the current time. The JEP controller 435 produces activity-based permissions policies based on the identified permissions context. As the permissions context changes (e.g., as time elapses or permissions data changes), the JEP controller 435 dynamically updates the activity-based permissions policies.

In one embodiment, the JEP controller 435 evaluates the permissions rules based on the permission context to generate the activity-based permissions policies. This evaluation may include compiling and executing and/or interpreting (collectively referred to as "interpreting") the permissions rules based on state information within the permission context to programmatically determine current dynamic permissions policies. For example, if the permissions rules indicate that a particular user has the right to perform a given action on a specified resource within a specified time interval, the JEP controller 435 will evaluate this rule and grant the permission if the current time is within the time interval and deny the permission if the current time is not within the time interval.

In one embodiment, the JEP controller 435 produces activity-based permissions policies that minimize the permissions available to users of the enterprise. Users have little or no permissions by default, and permissions are granted to the users only responsive to meeting conditions defined by the permissions rules. Further, in some embodiments the JEP controller 435 dynamically adjusts the activity-based permissions policies based on risk scores calculated by the risk score module 425. The permissions rules may be evaluated based on risk scores such that the rules produce different outcomes depending upon existing and/or resulting risk scores.

In other embodiments, the JEP controller 435 produces permissions policies based on one or more other factors. For example, the JEP controller 435 produces a context-based permissions policy. A context-based permissions policy evaluates one or more conditions to determine whether a user is able to execute actions on the authorization systems 110. Time of access, location of access, IP address, or other conditions may be implemented by the context-based permissions policy (e.g., permissions are granted to users responsive to an initial log-in to the enterprise system 120 and revoked responsive to a log-out at the end of a work day). In another example, the JEP controller 435 produces an activity-based permissions policy. The activity-based permissions policy is generated based at least in part on historical use of permissions for a past amount of time (e.g., 90 days, 1 year). In another example, the JEP controller 435 produces a risk-based permissions policy. As further discussed in conjunction with the risk score module 425, a risk-based permissions policy minimizes or reduces a risk score associated with one or more users or one or more authorization systems 110.

The JEP controller 435 regenerates the permissions policies on a regular basis, causing the permissions policies to change as the contexts, permissions rules, and other information change. For example, it may regenerate the permissions policies on a set schedule (e.g., every N minutes), upon change to permissions rules, risk scores, authorization systems 110, users, or upon other factors. As a result, the permissions policies change dynamically as the policies are regenerated, and are constantly updated as the context and/or other information changes.

The permissions policy delivery module 440 receives generated permissions policies from the permissions JEP controller 435 and transmits the permissions policies to the enterprise system 120. In one embodiment, the permissions policy delivery module 440 receives requests from the enterprise system 120 for permissions policies and transmits the policies responsive to the request. In another embodiment, the permissions policy delivery module 440 pushes the policies to the enterprise system 120 as the policies are updated.

The reporting engine 445 generates reports based on activities performed or permissions utilized by users of the authorization systems 110 associated with an enterprise. The reporting engine 445 receives data describing activity on the authorization systems 110 from the permissions analysis module 410, the risk score module 425, the anomaly detection module 430, and the JEP controller 435. Based on the received data, the reporting engine 445 generates business, administrative, or other reports for the authorization systems 110. For example, the reporting engine 445 generates benchmarking data reports, compliance data reports, and anomaly reports. In some embodiments, the reporting engine 445 generates one or more reports responsive to a request from an administrator or another user of the authorization systems 110. In other embodiments, the reporting engine 445 generates one or more reports at specified time intervals or at a specified time (e.g., at the end of each week, at the start of each month, biannually, etc.).

Figure 5:
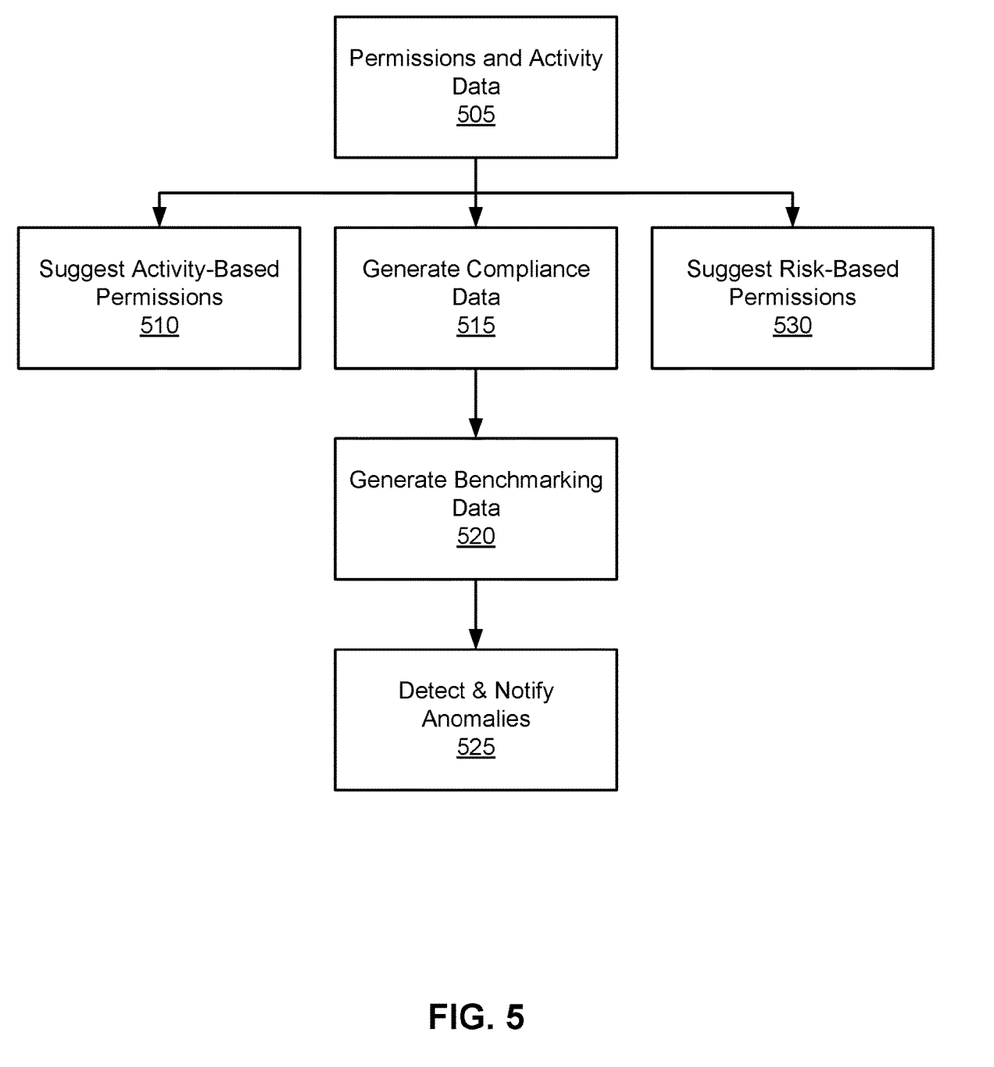
FIG. 5 is a flow chart illustrating example processes performed by the security server, in accordance with an embodiment.

FIG. 5 is a flow chart illustrating example processes performed by the security server 130, according to one embodiment. The security server 130 receives permissions and activity data 505 from sentries 118 for one or more authorization systems 110 associated with an enterprise. Based on the received permissions and activity data 505, the security server 130 suggests activity-based permissions 510, generates one or more reports including compliance data 515, benchmarking data 520, or anomaly reports 525, or suggests risk-based permissions data 530. In an embodiment, the security server 130 performs one or more actions responsive to a request by an administrator for the enterprise. In another embodiment, the security server 130 performs one or more actions at specified time intervals or at a specified time.

As described previously, the security server 130 suggests activity-based permissions 510 based on permissions and activity data 505 describing actions taken by users of the authorization systems 110. In one embodiment, the security system 130 suggests activity-based permissions such that users of the authorization systems 110 are able to perform actions based on previously successfully performed actions (e.g., actions that have been previously successfully performed by the user, actions that have been previously successfully performed by users associated with a same role, etc.). The security server 130 may suggest activity-based permissions 510 for one or more authorization systems associated with an enterprise.

The security server 130 generates one or more reports based on the permissions and activity data 505. Reports may be generated in one or more specified formats. For example, the security server 130 generates compliance data 515 describing adherence of the received data to one or more enterprise business rules and one or more legal or regulatory requirements for the enterprise. In another example, the security server 130 generates benchmarking data 520 describing enterprise processes and performance metrics (e.g., in comparison to industry best practices from one or more related enterprises). In another example, the security server 130 detects anomalies and generates notifications or reports alerting administrators of the enterprise to the anomalies, such that administrators are informed of anomalies that may impact the security of one or more authorization systems 110 associated with the enterprise.

The security server 130 suggests risk-based permissions 530 based on permissions and activity data 505. As described, the security server 130 determines a risk score. The risk score represents a likelihood that data stored on the one or more authorization systems 110 of an enterprise may be compromised or exploited due to a current permissions policy. Responsive to the risk score exceeding a threshold value (e.g., representing a high risk of exploitation), the security server 130 determines one or more sets of risk-based permissions 530 to minimize the risk score. For example, the security server 130 determines risk-based permissions 530 that removes high-risk permissions from users of the authorization systems 110 such that an overall risk score is lowered to an acceptable value (e.g., below the threshold value). In another example, the security server 130 determines risk-based permissions, modifies permissions for users of the authorization system 110 such that an overall risk score is lowered to an acceptable value.

In some embodiments, permissions suggested by the security server 130 are implemented automatically. In other embodiments, permissions suggested by the security server 130 are displayed to an administrator of the authorization systems 110 and are implemented responsive to an instruction from the administrator.

Figure 6:
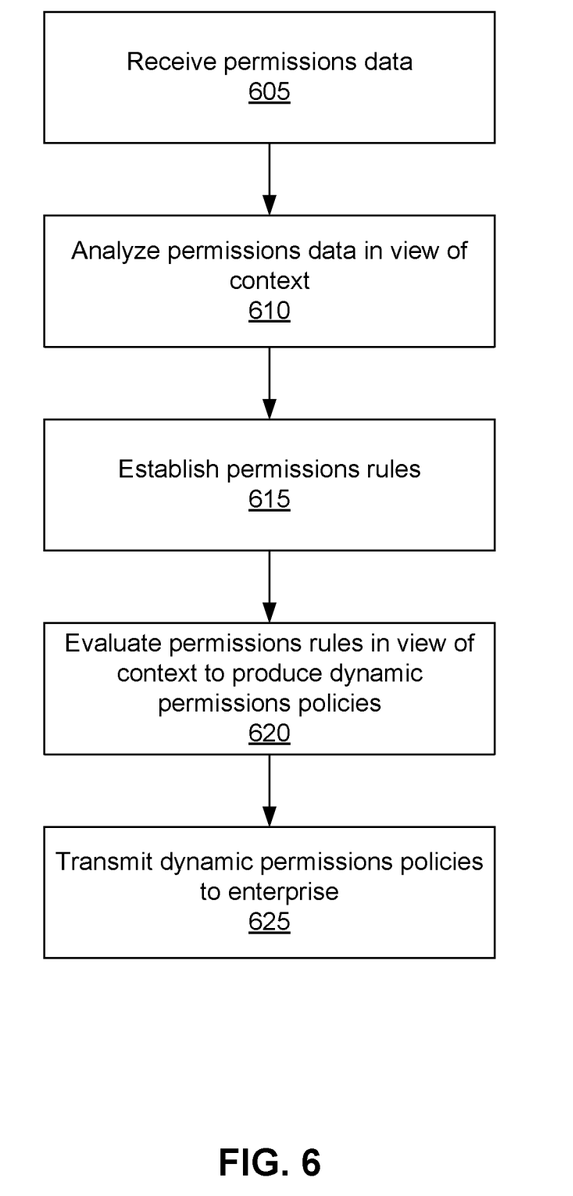
FIG. 6 is a flow chart illustrating a method of providing activity-based permissions for enterprise infrastructures, according to one embodiment.

FIG. 6 is a flow chart illustrating a method of providing dynamic permissions for enterprise data sources, according to one embodiment. The steps of FIG. 6 may be performed by the security server 130. Some or all of the steps may be performed by other entities in other embodiments. In addition, other embodiments may include different and/or additional steps, and the steps may be performed in different orders.

The security server 130 receives 605 permissions data describing permissions of users of an enterprise with respect to resources on one or more authorization systems 110. In one embodiment, the permissions data includes user identities and resources of the authorization systems, as well as logs describing actions performed or attempted by users of the enterprise with respect to resources of the authorization systems. The security server 130 analyzes 610 the received permissions data in view of a context, such as the current context. The security server 130 establishes 615 permissions rules for the authorization system 110, such as by retrieving rules provided by an administrator for the enterprise and stored in the permissions rules store.

The security server 130 evaluates 620 the permissions rules in view of the context to generate one or more activity-based permissions policies for the enterprise. The security server 130 transmits 625 the permissions policies to the enterprise system 120 for implementation at the authorization systems 110.

Figure 7:
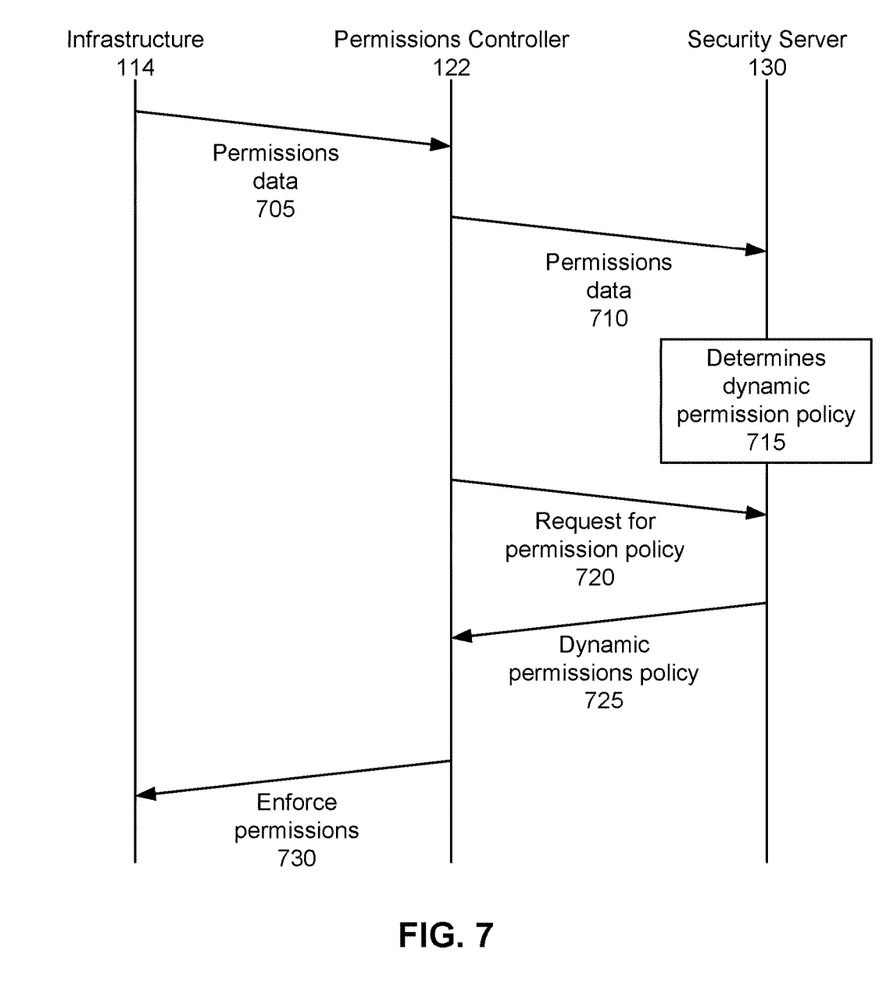
FIG. 7 is a transaction diagram illustrating interaction between one or more infrastructures, a permissions controller, and a security server, in accordance with an embodiment.

FIG. 7 is a transaction diagram illustrating interactions between an infrastructure 114, the permissions controller 122, and the security server 130, in accordance with an embodiment. The infrastructure 114 transmits 705 permissions data to the permissions controller 122. The permissions data describes permissions for users of an enterprise on the infrastructure. For example, the permissions data includes user identities, actions, and resources of the infrastructure 114. The permissions controller 122 transmits 710 the permissions data to the security server 130. Based in part on the permissions data, the security server 130 determines 715 an activity-based permissions policy. In one embodiment, the permissions policy is based at least in part on established permissions rules. The permissions controller 122 transmits 720 a request for the dynamic permissions policy to the security server 130. The security server 130 transmits 725 the dynamic permissions policy to the permissions controller 122 in response to the request. Based on the dynamic permissions policy, the permissions controller 122 enforces 730 dynamic permissions on the infrastructure 114.

Figure 8:
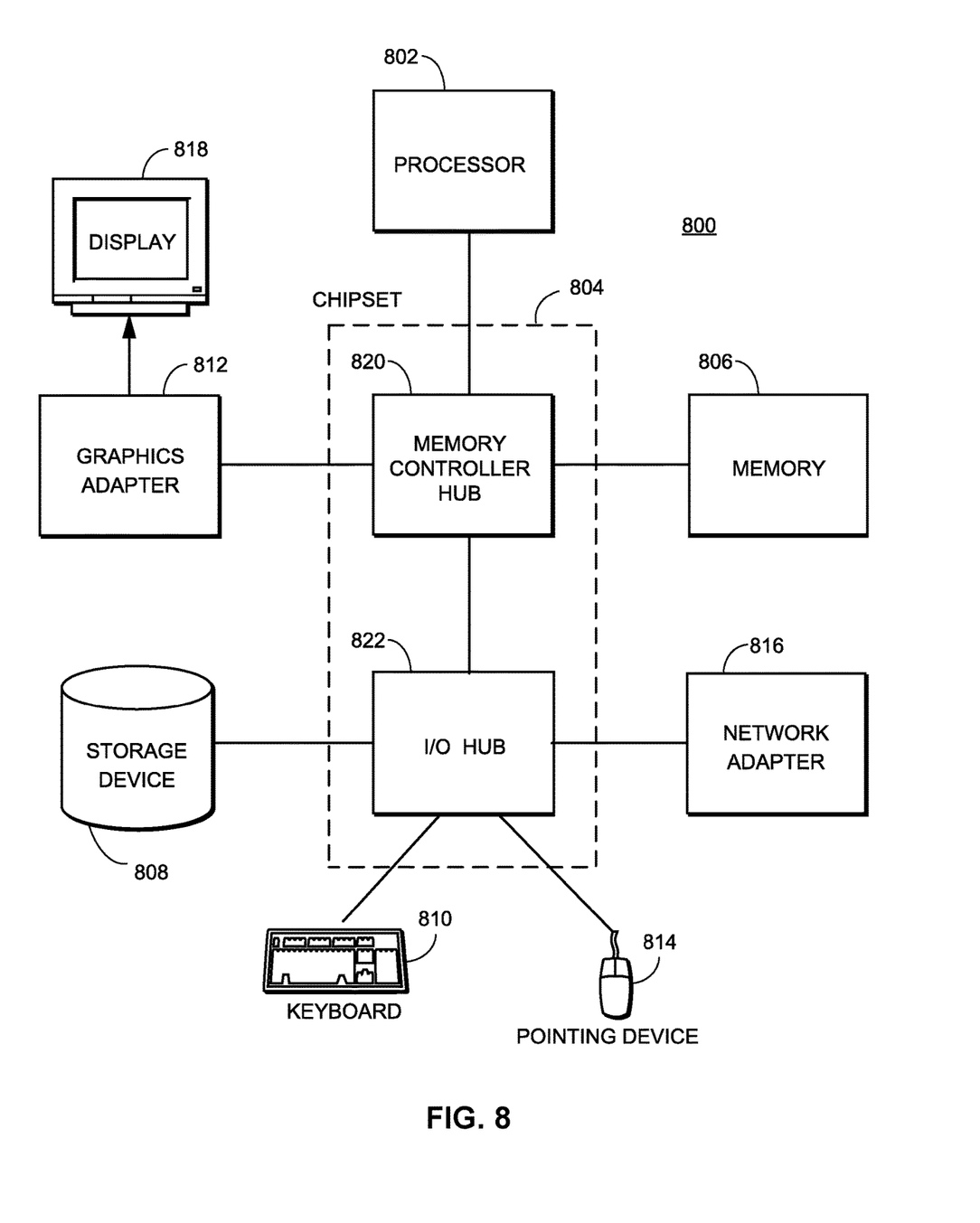
FIG. 8 is a high-level block diagram illustrating physical components of a computer used as part or all of one or more of the entities described herein in one embodiment.

FIG. 8 is a high-level block diagram illustrating physical components of a computer 800 used as part or all of one or more of the entities described herein in one embodiment. For example, instances of the illustrated computer 800 may be used as a server operating the messaging system 130. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In one embodiment, one or more sound devices (e.g., a loudspeaker, audio driver, etc.) is coupled to chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer 800. The graphics adapter 812 displays images and other information on the display 818. The network adapter 816 couples the computer system 800 to a local or wide area network.

As is known in the art, a computer 800 can have different and/or other components than those shown in FIG. 8. In addition, the computer 800 can lack certain illustrated components. In one embodiment, a computer 800 acting as a server may lack a keyboard 810, pointing device 814, graphics adapter 812, and/or display 818. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method of providing dynamic permissions for an enterprise authorization system, comprising:
establishing permissions rules for an authorization system of an enterprise;
receiving permissions data from the enterprise, the permissions data describing actions performed by users of the enterprise with respect to the authentication system and when the users performed the actions;
evaluating the permissions rules in view of the permissions data to produce a context-based permissions policy for the authorization system, wherein the context-based permissions policy specifies one or more conditions that are evaluated to determine whether to grant permissions to users of the enterprise with respect to the authorization system, the one or more conditions including a time of access condition that is determined based at least on when the users performed the actions as described by the permissions data; and
transmitting the context-based permissions policy to the enterprise, wherein the enterprise is adapted to implement the context-based permissions policy at the authorization system.

2. The method of claim 1, wherein the context-based permissions policy further specifies one or more of the following conditions that are evaluated to determine whether to grant permissions to users of the enterprise:
location of access;
Internet Protocol (IP) address; or
user login or logout state.

3. The method of claim 1, wherein establishing the permissions rules comprises receiving permissions rules provided by an administrator of the enterprise, the permissions rules describing permissions policies applicable to the users of the enterprise in given contexts; and
wherein the method further comprises:
evaluating the permissions rules in view of a context to produce a dynamic permissions policy for the authorization system, the context describing an environment of the authorization system at a point in time and the dynamic permissions policy describing permissions of users of the enterprise with respect to the authorization system and the context, and wherein evaluating the permissions rules in view of the context comprises evaluating the permissions rules in view of a current context at a current point in time; and
transmitting the dynamic permissions policy to the enterprise, wherein the enterprise is adapted to implement the dynamic permissions policy at the authorization system.

4. The method of claim 1, further comprising:
evaluating the permissions rules in view of a context to produce a dynamic permission policy for the authorization system, the context describing an environment of the authorization system at a point in time and the dynamic permissions policy describing permissions of users of the enterprise with respect to the authorization system and the context; and
transmitting the dynamic permissions policy to the enterprise, wherein the enterprise is adapted to implement the dynamic permissions policy at the authorization system;
wherein the context includes state information describing an environment involving the enterprise at a given point in time and wherein evaluating the permissions rules in view of the context to produce a dynamic permissions policy for the authorization system comprises:

interpreting the permissions rules based on the state information within the context to programmatically determine the dynamic permissions policy for the authorization system.

5. The method of claim 1, further comprising:

evaluating the permissions rules in view of a context to produce a dynamic permission policy for the authorization system, the context describing an environment of the authorization system at a point in time and the dynamic permissions policy describing permissions of users of the enterprise with respect to the authorization system and the context; and transmitting the dynamic permissions policy to the enterprise, wherein the enterprise is adapted to implement the dynamic permissions policy at the authorization system;

wherein evaluating the permissions rules in view of the context comprises:

receiving permissions rules provided by an administrator of the enterprise, the permissions rules describing permissions policies applicable to the users of the enterprise in given contexts;

calculating a risk score, the risk score representing a likelihood that data stored on the authorization system is compromised; and based on the calculated risk score and the permissions rules, producing a dynamic permissions policy for the authorization system.

6. The method of claim 1, wherein transmitting the context-based permissions policy to the enterprise comprises:

receiving, from a permissions controller within the enterprise, a request for the context-based permissions policy; and transmitting the context-based permissions policy to the permissions controller within the enterprise in response to the request;

wherein the permissions controller is adapted to interact with the authorization system to configure an infrastructure of the authorization system to implement the context-based permissions policy at the authorization system.

7. The method of claim 1, further comprising:

receiving a request from the enterprise for an updated context-based permissions policy;

reevaluating the permissions rules in view of new permissions data from the enterprise to produce an updated context-based permissions policy for the authorization system; and transmitting the updated context-based permissions policy to the authorization system in response to the request.

8. A non-transitory computer-readable storage medium storing computer program instructions executable by a processor to perform operations comprising:

establishing permissions rules for an authorization system of an enterprise;

receiving permissions data from the enterprise, the permissions data describing actions performed by users of the enterprise with respect to the authorization system and when the users performed the actions;

evaluating the permissions rules in view of the permissions data to produce a context-based permissions policy for the authorization system, wherein the context-based permissions policy specifies one or more conditions that are evaluated to determine whether to grant permissions to users of the enterprise with respect to the authorization system, the one or more conditions including a time of access condition that is determined based at least on when the users performed the actions as described by the permissions data; and transmitting the context-based permissions policy to the enterprise, wherein the enterprise is adapted to implement the context-based permissions policy at the authorization system.

9. The computer-readable storage medium of claim 8, wherein the context-based permissions policy further specifies one or more of the following conditions that are evaluated to determine whether to grant permissions to users of the enterprise:

location of access;

Internet Protocol (IP) address; or user login or logout state.

10. The computer-readable storage medium of claim 8, wherein establishing the permissions rules comprises receiving permissions rules provided by an administrator of the enterprise, the permissions rules describing permissions policies applicable to the users of the enterprise in given contexts; and wherein the operations further comprise:

evaluating the permissions rules in view of a context to produce a dynamic permissions policy for the authorization system, the context describing an environment of the authorization system at a point in time and the dynamic permissions policy describing permissions of users of the enterprise with respect to the authorization system and the context, and wherein evaluating the permissions rules in view of the context comprises evaluating the permissions rules in view of a current context at a current point in time; and transmitting the dynamic permissions policy to the enterprise, wherein the enterprise is adapted to implement the dynamic permissions policy at the authorization system.

11. The computer-readable storage medium of claim 8, wherein the operations further comprise:

evaluating the permissions rules in view of a context to produce a dynamic permission policy for the authorization system, the context describing an environment of the authorization system at a point in time and the dynamic permissions policy describing permissions of users of the enterprise with respect to the authorization system and the context; and transmitting the dynamic permissions policy to the enterprise, wherein the enterprise is adapted to implement the dynamic permissions policy at the authorization system; and wherein the context includes state information describing an environment involving the enterprise at a given point in time and wherein evaluating the permissions rules in view of the context to produce a dynamic permissions policy for the authorization system comprises:

interpreting the permissions rules based on the state information within the context to programmatically determine the dynamic permissions policy for the authorization system.

12. The computer-readable storage medium of claim 8, wherein the operations further comprise:

evaluating the permissions rules in view of a context to produce a dynamic permission policy for the authorization system, the context describing an environment of the authorization system at a point in time and the dynamic permissions policy describing permissions of users of the enterprise with respect to the authorization system and the context; and transmitting the dynamic permissions policy to the enterprise, wherein the enterprise is adapted to implement the dynamic permissions policy at the authorization system; and wherein evaluating the permissions rules in view of the context comprises:

receiving permissions rules provided by an administrator of the enterprise, the permissions rules describing permissions policies applicable to the users of the enterprise in given contexts;

calculating a risk score, the risk score representing a likelihood that data stored on the authorization system is compromised; and based on the calculated risk score and the permissions rules, producing a dynamic permissions policy for the authorization system.

13. The computer-readable storage medium of claim 8, wherein transmitting the context-based permissions policy to the enterprise comprises:

receiving, from a permissions controller within the enterprise, a request for the context-based permissions policy; and transmitting the context-based permissions policy to the permissions controller within the enterprise in response to the request;

wherein the permissions controller is adapted to interact with the authorization system to configure an infrastructure of the authorization system to implement the context-based permissions policy at the authorization system.

14. The computer-readable storage medium of claim 8, wherein the operations further comprise:

receiving a request from the enterprise for an updated context-based permissions policy;

reevaluating the permissions rules in view of new permissions data from the enterprise to produce an updated context-based permissions policy for the authorization system; and transmitting the updated context-based permissions policy to the authorization system in response to the request.

15. A system comprising:

a computer processor for executing computer program instructions; and a non-transitory computer-readable storage medium storing computer program instructions executable by the processor to perform operations comprising:

establishing permissions rules for an authorization system of an enterprise;

receiving permissions data from the enterprise, the permissions data describing actions performed by users of the enterprise with respect to the authorization system and when the users performed the actions;

evaluating the permissions rules in view of the permissions data to produce a context-based permissions policy for the authorization system, wherein the context-based permissions policy specifies one or more conditions that are evaluated to determine whether to grant permissions to users of the enterprise with respect to the authorization system, the one or more conditions including a time of access condition that is determined based at least on when the users performed the actions as described by the permissions data; and transmitting the context-based permissions policy to the enterprise, wherein the enterprise is adapted to implement the context-based permissions policy at the authorization system.

16. The system of claim 15, wherein the context-based permissions policy further specifies one or more of the following conditions that are evaluated to determine whether to grant permissions to users of the enterprise:

location of access;

Internet Protocol (IP) address; or user login or logout state.

17. The system of claim 15, wherein establishing the permissions rules comprises receiving permissions rules provided by an administrator of the enterprise, the permissions rules describing permissions policies applicable to the users of the enterprise in given contexts; and wherein the operations further comprise:

evaluating the permissions rules in view of a context to produce a dynamic permissions policy for the authorization system, the context describing an environment of the authorization system at a point in time and the dynamic permissions policy describing permissions of users of the enterprise with respect to the authorization system and the context, and wherein evaluating the permissions rules in view of the context comprises evaluating the permissions rules in view of a current context at a current point in time; and transmitting the dynamic permissions policy to the enterprise, wherein the enterprise is adapted to implement the dynamic permissions policy at the authorization system.

18. The system of claim 15, wherein the operations further comprise:

evaluating the permissions rules in view of a context to produce a dynamic permission policy for the authorization system, the context describing an environment of the authorization system at a point in time and the dynamic permissions policy describing permissions of users of the enterprise with respect to the authorization system and the context; and transmitting the dynamic permissions policy to the enterprise, wherein the enterprise is adapted to implement the dynamic permissions policy at the authorization system; and wherein the context includes state information describing an environment involving the enterprise at a given point in time and wherein evaluating the permissions rules in view of the context to produce a dynamic permissions policy for the authorization system comprises:

interpreting the permissions rules based on the state information within the context to programmatically determine the dynamic permissions policy for the authorization system.

19. The system of claim 15, wherein the operations further comprise:

evaluating the permissions rules in view of a context to produce a dynamic permission policy for the authorization system, the context describing an environment of the authorization system at a point in time and the dynamic permissions policy describing permissions of users of the enterprise with respect to the authorization system and the context; and transmitting the dynamic permissions policy to the enterprise, wherein the enterprise is adapted to implement the dynamic permissions policy at the authorization system; and wherein evaluating the permissions rules comprises:
receiving permissions rules provided by an administrator of the enterprise, the permissions rules describing permissions policies applicable to the users of the enterprise in given contexts;
calculating a risk score, the risk score representing a likelihood that data stored on the authorization system is compromised; and
based on the calculated risk score and the permissions rules, producing a dynamic permissions policy for the authorization system.

20. The system of claim 15, wherein transmitting the context-based permissions policy to the enterprise further comprises:
receiving, from a permissions controller within the enterprise, a request for the context-based permissions policy; and
transmitting the context-based permissions policy to the permissions controller within the enterprise in response to the request;
wherein the permissions controller is adapted to interact with the authorization system to configure an infrastructure of the authorization system to implement the context-based permissions policy at the authorization system.

* * * * *